US012654542B2

(12) United States Patent
Hendriks et al.

(10) Patent No.: US 12,654,542 B2
(45) Date of Patent: Jun. 16, 2026

(54) VEHICLE CAB ARRANGEMENT WITH VERTICALLY EXTENDING COOLING RADIATOR

(71) Applicant: VOLVO TRUCK CORPORATION, Gothenburg (SE)

(72) Inventors: Jan Hendriks, Västra Frölunda (SE); Viktor Karlsson, Mölndal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 346 days.

(21) Appl. No.: 18/253,362

(22) PCT Filed: Nov. 24, 2020

(86) PCT No.: PCT/EP2020/083230
§ 371 (c)(1),
(2) Date: May 17, 2023

(87) PCT Pub. No.: WO2022/111796
PCT Pub. Date: Jun. 2, 2022

(65) Prior Publication Data
US 2023/0415563 A1     Dec. 28, 2023

(51) Int. Cl.
B60K 11/04     (2006.01)
B60K 1/04     (2019.01)
(Continued)

(52) U.S. Cl.
CPC ................ B60K 11/04 (2013.01); B60K 1/04 (2013.01); B60K 11/08 (2013.01); B60L 50/71 (2019.02);
(Continued)

(58) Field of Classification Search
CPC .......... B62D 33/06; B60K 1/04; B60K 11/04; B60K 11/08
See application file for complete search history.

(56) References Cited

U.S. PATENT DOCUMENTS 2,913,065 A * 11/1959 Lyon, Jr. ................ B60K 11/04
                                                              180/68.1
11,964,590 B2 * 4/2024 Watanabe ............... B60L 58/26
(Continued)

FOREIGN PATENT DOCUMENTS

CN     102575660 A     7/2012
CN     110497770 A     11/2019
(Continued)

OTHER PUBLICATIONS

International Search Report and Written Opinion in corresponding International Application No. PCT/EP2020/083230 mailed Jun. 23, 2021 (11 pages).
(Continued)

*Primary Examiner* — Brian L Swenson
(74) *Attorney, Agent, or Firm* — Jeffri A. Kaminski; Venable LLP

(57)     ABSTRACT

There is provided a vehicle cab arrangement. The vehicle cab arrangement comprises a cabin for housing a human driver of a vehicle. The vehicle cab arrangement comprises a horizontally extending fuel cell stack. The fuel cell stack is placed vertically below the cabin. The vehicle cab arrangement comprises a horizontally extending cooling radiator. The cooling radiator is placed between the cabin and the fuel cell stack.

13 Claims, 3 Drawing Sheets

(51) Int. Cl.

| | |
|---|---|
| *B60K 11/08* | (2006.01) |
| *B60L 50/71* | (2019.01) |
| *B62D 33/06* | (2006.01) |
| *H01M 8/04007* | (2016.01) |
| *H01M 8/04029* | (2016.01) |
| *B60K 1/00* | (2006.01) |

(52) U.S. Cl.
CPC ........ *B62D 33/06* (2013.01); *H01M 8/04029* (2013.01); *H01M 8/04074* (2013.01); *B60K 2001/005* (2013.01); *B60K 2001/0438* (2013.01); *H01M 2250/20* (2013.01)

(56) References Cited

U.S. PATENT DOCUMENTS

| | | | | |
|---|---|---|---|---|
| 2002/0117345 | A1* | 8/2002 | Sztykiel | B60K 11/04 180/291 |
| 2002/0189873 | A1 | 12/2002 | Mizuno | |
| 2005/0023057 | A1* | 2/2005 | Maeda | F28F 1/128 180/68.1 |
| 2006/0048984 | A1 | 3/2006 | Pleune et al. | |
| 2008/0000615 | A1* | 1/2008 | Hiroshima | F01P 3/18 165/41 |
| 2009/0025994 | A1* | 1/2009 | Kakishita | B60K 11/08 180/68.6 |
| 2012/0085510 | A1* | 4/2012 | Kim | B60K 11/04 165/44 |
| 2013/0059519 | A1* | 3/2013 | Tajima | B60K 11/04 454/152 |
| 2021/0155074 | A1* | 5/2021 | Vaddiraju | B60K 11/02 |

FOREIGN PATENT DOCUMENTS

| | | | |
|---|---|---|---|
| DE | 102017215522 | A1 | 3/2019 |
| JP | 9226630 | A | 9/1997 |
| JP | 3082660 | B2 | 8/2000 |

OTHER PUBLICATIONS

International Preliminary Report on Patentability in corresponding International Application No. PCT/EP2020/083230 mailed Mar. 15, 2023 (7 pages).

* cited by examiner

VEHICLE CAB ARRANGEMENT WITH VERTICALLY EXTENDING COOLING RADIATOR

CROSS-REFERENCE TO RELATED APPLICATIONS

This application is a U.S. National Stage application of PCT/EP2020/083230, filed Nov. 24, 2020 and published on Jun. 2, 2022 as WO 2022/111796, all of which is hereby incorporated by reference in its entirety.

TECHNICAL FIELD

Embodiments presented herein relate to a vehicle cab arrangement comprising a cabin, a fuel cell stack, and a cooling radiator. Embodiments presented herein further relate to a vehicle comprising such a vehicle cab arrangement.

BACKGROUND

Numerous components on a vehicle generate heat in performing their intended functions. Accordingly, cooling systems are provided. The cooling systems might typically comprise a heat-dissipating component, hereinafter referred to as a cooling radiator, and a cooling circuit. The cooling circuit is typically filled with a circulating liquid coolant By means of the cooling circuit, the liquid coolant is directed past the heat-generating components and the cooling radiator in order for excess heat as generated by the heat-generating components to be transferred to the cooling radiator. Outside air is directed over, or through, the cooling radiator to lower the temperature of the liquid coolant and the liquid coolant is then re-directed to the heat-generating component. Cooling systems are typically designed with a single cooling radiator, centrally located in a frontward portion of the vehicle.

Typically, trucks, but also other types of vehicles, have the cooling radiators placed in the front of the vehicle in a vertical position. In this position, the available height for the cooling radiator is limited by the ground clearance and the lower floor of the cabin housing the human driver of the vehicle. The available width is limited by the cab suspension and steering gear, and also by the placement of the pedals (brake, accelerator) inside the cabin. The depth of the cooling radiator is also limited, as thicker cooling radiator give more air resistance, thus causing the cooling efficiency to be reduced.

Fuel cell vehicles (FCVs), also denoted fuel cell electric vehicles (FCEVs), are a type of electric vehicle that uses a fuel cell, sometimes in combination with a small battery or supercapacitor, to power its onboard electric motor. Fuel cells in vehicles generate electricity generally using oxygen from the air and compressed hydrogen. The performance and durability (i.e., life span) of fuel cells is more temperature sensitive than fuel used by combustion engines.

As the existing cooling capacity for the combustion engine will be needed for cooling of the batteries, electrical motors, electrical motor drivers as well as for high voltage electronics, additional cooling capacity is required for ensuring the performance and durability of the vehicle as a whole.

One option is to increase the size, or volume, of the available space in the vehicle for housing an additional cooling system. However, this could cause the available size, or volume, for cargo etc. to be reduced if the total size, or volume, of the vehicle is not to be increased.

Another option is therefore to increase the overall size, or volume, of the vehicle to make ample room for an additional cooling system. However, this could result in that the vehicle does no longer comply with regulations in terms of maximum allowable size.

Hence, there is still a need for improvements with respect to provision of cooling systems in vehicles.

SUMMARY

An object of embodiments herein is to provide a cooling system, in terms of a cooling radiator, in a vehicle cab arrangement where the above issues are avoided, or at least mitigated or reduced.

According to a first aspect there is presented a vehicle cab arrangement. The vehicle cab arrangement comprises a cabin for housing a human driver of a vehicle. The vehicle cab arrangement comprises a horizontally extending fuel cell stack. The fuel cell stack is placed vertically below the cabin. The vehicle cab arrangement comprises a horizontally extending cooling radiator. The cooling radiator is placed between the cabin and the fuel cell stack.

According to second aspect there is provided a vehicle comprising such a vehicle cab arrangement.

Advantageously, a vehicle cab arrangement with such a placement of the cooling radiator avoids the issues noted above.

Advantageously, this placement of the cooling radiator enables efficient cooling of the fuel cell stack.

Advantageously, this placement of the cooling radiator does not require any change of the existing vehicle architecture.

In some embodiments, the cooling radiator is placed to be horizontally extending within an angle of inclination of at most 15 degrees, preferably at most 10 degrees.

In some embodiments, the cooling radiator has an inlet for receiving an airflow for providing cooling to the cooling radiator and an outlet for exhausting the airflow as heated when passing through the cooling radiator.

In some embodiments, the vehicle cab arrangement further comprises a cooling circuit filled with a cooling medium, wherein the cooling circuit is arranged relative the fuel cell stack for the cooling medium to absorb heat from the fuel cell stack, and the cooling radiator is arranged relative the cooling circuit for cooling the cooling medium.

In some embodiments, the fuel cell stack and the cooling radiator are provided in a sandwich arrangement.

Further embodiments, aspects, and examples, relating to the vehicle cab arrangement will be disclosed in the following description and in the dependent claims.

Further advantages and advantageous features of the herein disclosed embodiments are disclosed in the following description and in the dependent claims.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION OF EXAMPLE EMBODIMENTS

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
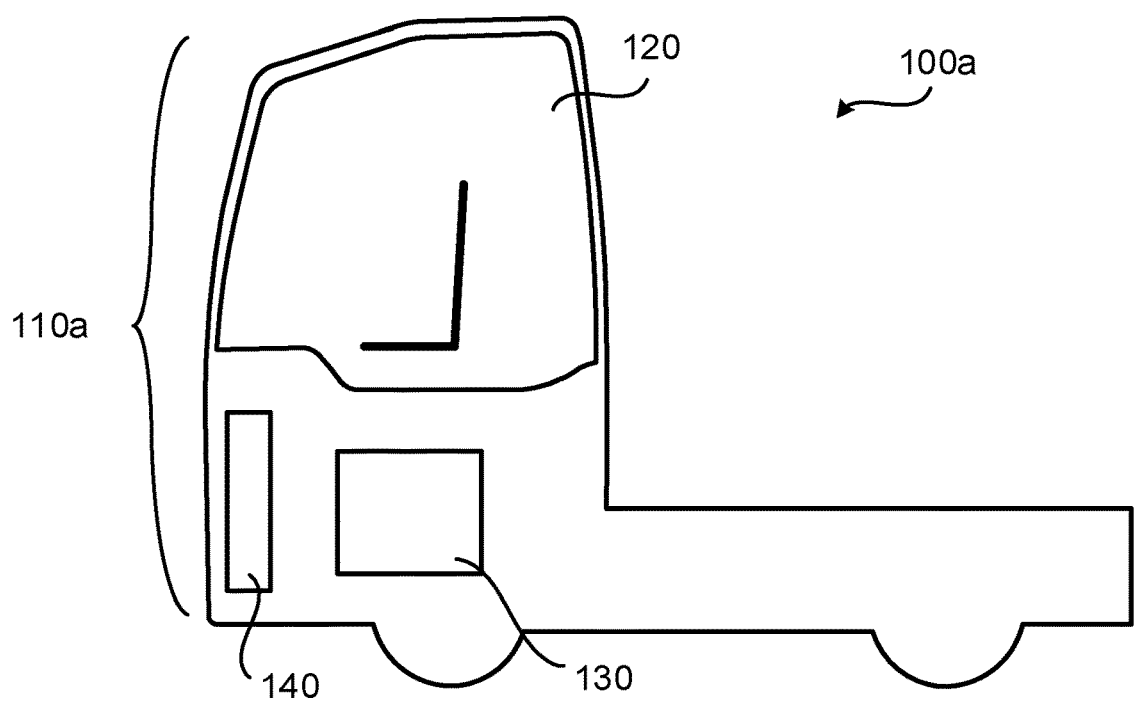
FIGS. 1, 2, and 3 are schematic diagram illustrating vehicle cab arrangements.

FIG. 1 is a schematic diagram illustrating a vehicle cab arrangement 110*a* of a vehicle 100*a* according to a first example. FIG. 1 gives an examples of a vehicle 100*a* having a combustion engine 130. The combustion engine 130 is cooled by a vertically extending cooling radiator 140 that forms part of a cooling system. One illustrative example of how the cooling radiator 140 might be arranged to cool the combustion engine 130 will now be disclosed. In some examples, the cooling radiator 140 is connected to a cooling circuit, such as one or more channels, running through the combustion engine 130 and a cylinder head, through which a cooling medium, such as a cooling liquid, is pumped. This cooling medium might be water or a mixture of water and antifreeze in proportions appropriate to the climate. The antifreeze itself could be ethylene glycol or propylene glycol (with a small amount of corrosion inhibitor). A series of galleries might be cast into the engine block and cylinder head, surrounding the combustion chambers with a circulating cooling medium to carry away heat. The cooling radiator 140 might comprise a plurality of small tubes equipped with a honeycomb of fins to dissipate heat rapidly and is arranged to receive, and cool, the cooling medium as heated by the combustion engine 130. The cooling medium might be circulated by natural convection or a pump. In the latter case, the amount of circulation might be adaptively controlled. For example, a thermostat can be provided to control the temperature of the combustion engine 140 by varying the speed at which the cooling medium is circulated through the cooling circuit. In turn, the cooling radiator 140 might be cooled by a fan arranged to draw cool air through the cooling radiator 140. In this way the cooling radiator 140 transfers heat from the cooling medium to the air outside, thereby cooling the cooling medium, which in turn cools the combustion engine 130.

Figure 2:
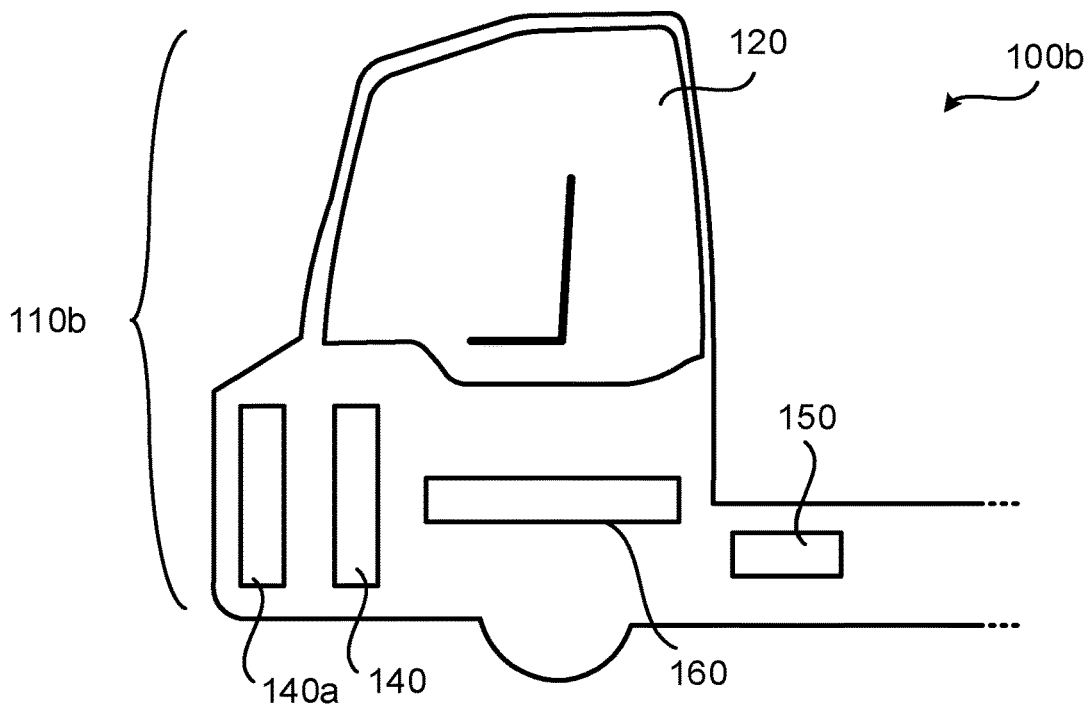
Figure 3:
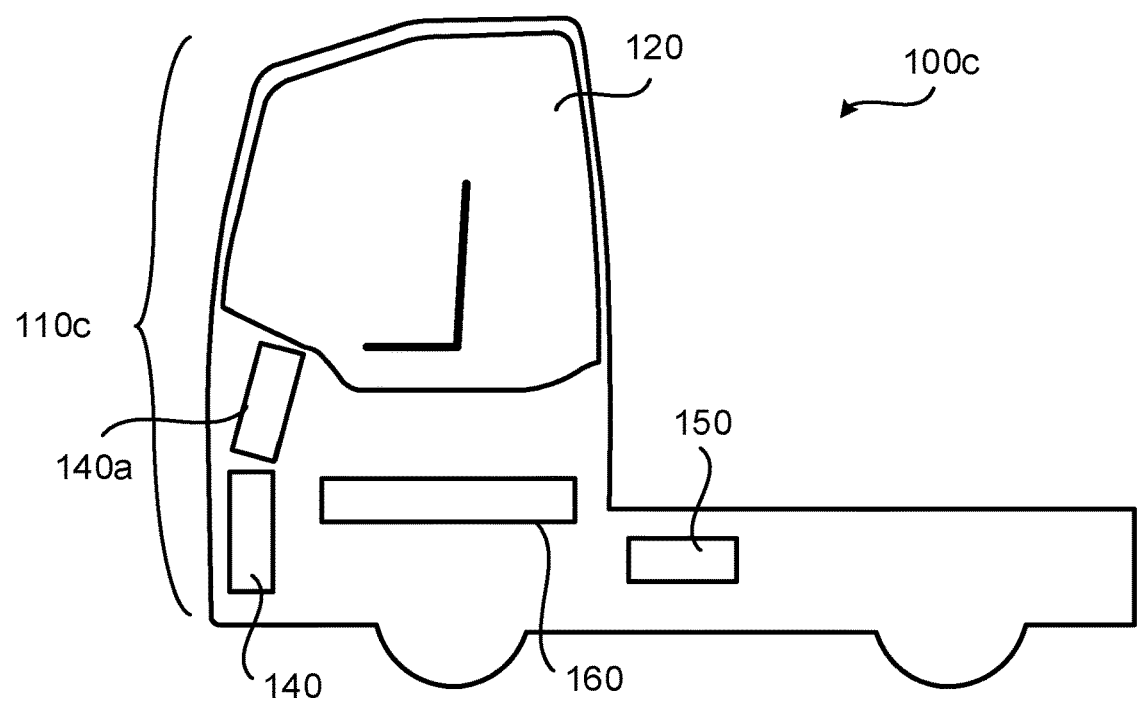

As noted above, there is still a need for improvements with respect to provision of cooling systems in vehicles, especially for FCVs or FCEVs where the onboard electric motor of the vehicle is powered by a fuel cell stack. To illustrate his, reference will in turn be made to FIG. 2 and FIG. 3 illustrating vehicle cab arrangements 100*b*, 100*c* of a vehicle 100*b*, 100*c* according to further examples. In both these figures, an electric motor 150 of the vehicle 100*b*, 100*c* is powered by a fuel cell stack 160.

FIG. 2 is a schematic diagram illustrating a vehicle cab arrangement 110*b* of a vehicle 100*b* according to a second example. According to this example, the hood of the cab is horizontally extended so as to provide room for an extra cooling radiator 140*a*. However, as noted above, this could result in that the vehicle 100*b* does no longer comply with regulations in terms of maximum allowable size. Alternatively, the overall length of the vehicle 100*b* must be made shorter. This, in turn, could cause the available size, or volume, for cargo etc. to be reduced. In addition, the cooling radiator 140*a*, when arranged as in FIG. 2, might be inadequate to efficiently cool the fuel cell stack 160.

FIG. 3 is a schematic diagram illustrating a vehicle cab arrangement 110*c* of a vehicle 100*c* according to a third example. According to this example, an extra cooling radiator 140*a* is arranged to fit inside the existing vehicle architecture. In the example of FIG. 3, the extra cooling radiator 140*a* is arranged adjacent the existing cooling radiator 140. However, since space is limited, this might possibly cause the size of the existing cooling radiator 140 to be reduced. This in order for both cooling radiators 140, 140*a* to fit inside the existing vehicle architecture. Additionally, the cooling radiator 140*a*, when arranged as in FIG. 3, might be inadequate to efficiently cool the fuel cell stack 160.

One particular object of the herein disclosed embodiments is to arrange what above is referred to as an additional cooling system in a vehicle, such as vehicle 100*a* of FIG. 1, to efficiently cool a fuel cell stack 160 and without having to change the vehicle architecture.

Figure 4:
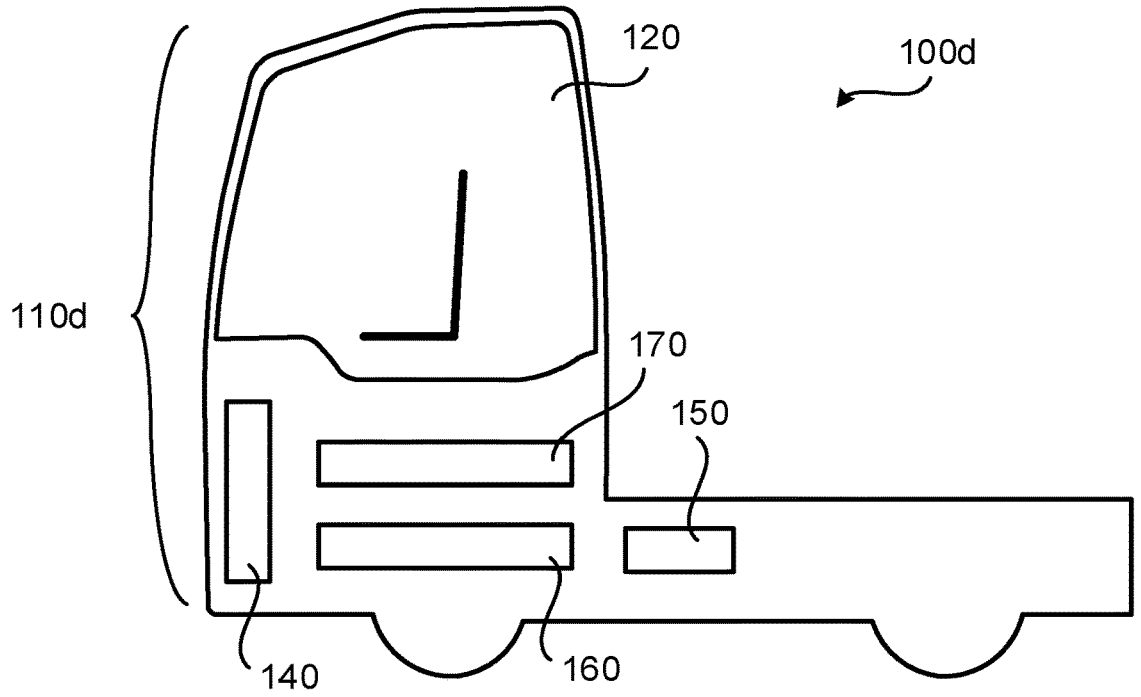
FIGS. 4 and 5 are schematic diagrams illustrating vehicle cab arrangements according to embodiments.

Reference is now made to FIG. 4 which is schematic diagram illustrating vehicle cab arrangement 110*d* of a vehicle 100*d* according to an embodiment.

The vehicle cab arrangement 110*d* comprises a cabin 120 for housing a human driver of the vehicle 100*d*. The vehicle cab arrangement 110*d* comprises a horizontally extending fuel cell stack 160. The fuel cell stack 160 is placed vertically below the cabin 120. The vehicle cab arrangement 110*d* therefore comprises a horizontally extending cooling radiator 170. The cooling radiator 170 is placed between the cabin 120 and the fuel cell stack 160.

The disclosed vehicle cab arrangement 110*d* thus allows the cooling radiator 170 to be placed in the available space in between the fuel cell stack 160 and the underside of the cabin floor. In addition to the vertically extending cooling radiator 140, a horizontally extending cooling radiator 170 can thus be provided in between the fuel cell stack 160 and the underside of the cabin floor. The fuel cell stack 160 thus forms a lower limit for the vertical extension of the cooling radiator 170 whereas the underside of the cabin floor forms an upper limit for the vertical extension of the cooling radiator 170.

This placement of the cooling radiator 170 does not require any change of the existing vehicle architecture.

In some examples the cooling radiator 170 is sandwiches with the fuel cell stack 160. That is, in some embodiments, the fuel cell stack 160 and the cooling radiator 170 are provided in a sandwich arrangement.

Figure 5:
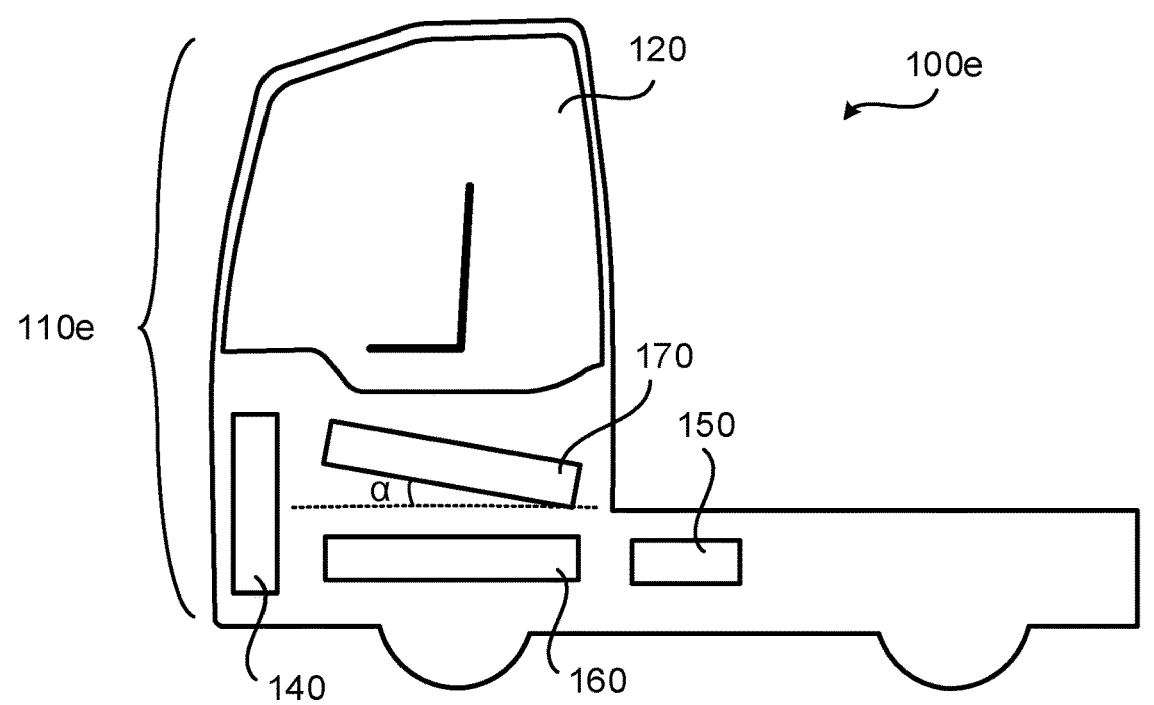

Aspects of the placement of the cooling radiator 170 will now be disclosed with reference to FIG. 5.

FIG. 5 is schematic diagram illustrating a vehicle cab arrangement 110*e* of a vehicle 100*e* according to an embodiment. The vehicle cab arrangement 110*e* is similar to the vehicle cab arrangement 110*d* and thus comprises a cabin 120 for housing a human driver of the vehicle 100*d*. The vehicle cab arrangement 110*e* comprises a horizontally extending fuel cell stack 160. The fuel cell stack 160 is placed vertically below the cabin 120. The vehicle cab arrangement 110*e* therefore comprises a horizontally extending cooling radiator 170. The cooling radiator 170 is placed between the cabin 120 and the fuel cell stack 160.

FIG. 5 schematically illustrates a vehicle cab arrangement 110*e* where the cooling radiator 170 is tilted at most ±10 degrees (with respect to the horizontal axis). This is in comparison to FIG. 4 where the cooling radiator 170 is placed to be horizontally extending along the horizontal axis. In FIG. 5 the cooling radiator 170 is placed at an angle of inclination α≠0 with respect to the horizontal axis. In particular, in some embodiments, the cooling radiator 170 is placed to be horizontally extending within an angle of inclination α of at most 15 degrees, preferably at most 10 degrees. The placement of the cooling radiator 170 is thus predominantly horizontal (deviating at most ±15 or ±10 from the horizontal axis).

Figure 6:
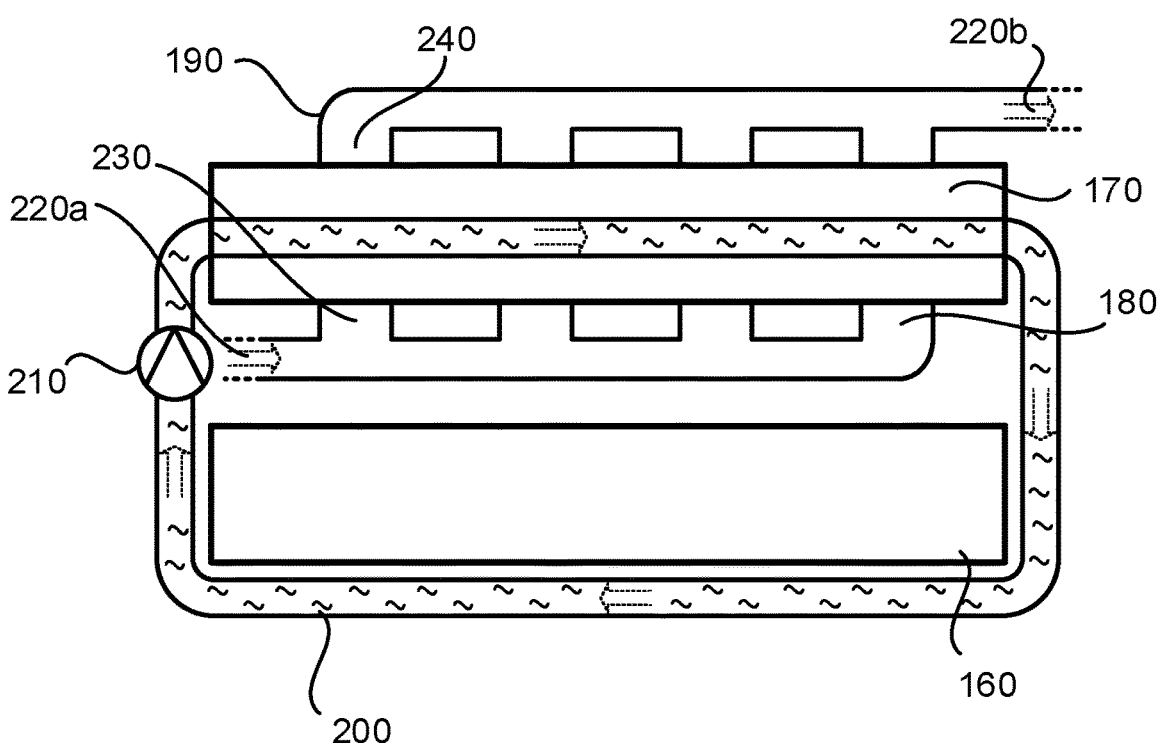
FIG. 6 is schematic diagram illustrating a cooling radiator according to embodiments.

Further embodiments, aspects, and examples of the vehicle cab arrangements 110*d*, 110*e* will be disclosed hereinafter with continued reference to FIG. 4 and FIG. 5 and with parallel reference to FIG. 6. FIG. 6 illustrates the cooling radiator 170 (and also the fuel cell stack 160) according to embodiments.

Aspects of the cooling radiator 170 will now be disclosed.

In some examples, the cooling radiator 170 is configured to receive cool air and to exhaust heated air. In particular, in some embodiments, the cooling radiator 170 has an intel 180 and an outlet 190. The intel 180 is arranged for receiving an airflow (represented by arrow 220*a* in FIG. 6). The airflow provides cooling to the cooling radiator 170. Since the cooling radiator 170 is arranged to absorb heat from the fuel cell stack 160, the airflow becomes heated when passing through the cooling radiator 170. The outlet 190 is arranged for exhausting the airflow 220*b* as heated when passing through the cooling radiator 170.

Aspects of the inlet 180 will now be disclosed.

In some examples, cool air enters the cooling radiator 170 via the intel 180 at the bottom of the cooling radiator 170. That is, in some embodiments, the intel 180 is placed on a vertically downwards facing surface of the cooling radiator 170.

In some examples guiding means 230 are provided to help guiding the airflow (represented by arrow 220*a* in FIG. 6) into the cooling radiator 170. In particular, in some embodiments, the intel 180 comprises first guiding means 230 for guiding cool air from outside of the vehicle cab arrangement 110*d*, 110*e* to the cooling radiator 170. The first guiding means 230 might be a first deflector.

Aspects of the outlet 190 will now be disclosed.

In some examples, heated air exits the cooling radiator 170 via the outlet 190 at the top of the cooling radiator 170. That is, in some embodiments, the outlet 190 is placed on a vertically upwards facing surface of the cooling radiator 170.

Alternatively, cool air enters the cooling radiator 170 via the intel 180 at the bottom of the cooling radiator 170 and heated air exits the cooling radiator 170 via the outlet 190 at the top of the cooling radiator 170. The following examples are applicable regardless if the cool air enters at the top or the bottom of the cooling radiator 170.

In some examples guiding means 240 are provided to help guiding the airflow 220*b* out from the cooling radiator 170. In particular, in some embodiments, the outlet 190 comprises second guiding means 240 for guiding heated air from the cooling radiator 170 to outside of the vehicle cab arrangement 110*d*, 110*e*. The second guiding means 240 might be a second deflector.

Deflectors can thus be added on the lower side and/or the upper side of the cooling radiator 170 to help guiding the airflow through the cooling radiator 170.

Further aspects of how to cool the fuel cell stack 160 will now be disclosed.

In some examples, a cooling circuit 200 is arranged to surround fuel cell stack 160. Further, the cooling circuit 200 might pass through the cooling radiator 170 such that a cooling medium in the cooling circuit 200 is heated by the fuel cell stack 160 and cooled by the cooling radiator 170. That is, in some embodiments, the vehicle cab arrangement 110*d*, 110*e* further comprises a cooling circuit 200 filled with a cooling medium. The cooling circuit 200 is arranged relative the fuel cell stack 160 for the cooling medium to absorb heat from the fuel cell stack 160. The cooling radiator 170 is arranged relative the cooling circuit 200 for cooling the cooling medium. The cooling medium might in the cooling circuit 200 be circulated by natural convection or by a pump 210, or a combination thereof. Circulation of the cooling medium is in FIG. 6 illustrated by arrows inside the cooling circuit 200.

The herein disclosed vehicle cab arrangement 110*d*, 110*e* could be part of a vehicle 100*d*, 100*e*. Hence, in some aspects, there is also provided vehicle 100*d*, 100*e* that comprises a vehicle cab arrangement 110*d*, 110*e* as herein disclosed. There could be different types of vehicles 100*d*, 100*e* where the herein disclosed vehicle cab arrangement 110*d*, 110*e* can be provided. In some non-limiting examples, the vehicle 100*d*, 100*e* is any of: a truck, a bus, a piece of construction equipment, a personal vehicle.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A vehicle cab arrangement, the vehicle cab arrangement comprising:
   a cabin for housing a human driver of a vehicle;
   a horizontally extending fuel cell stack, the fuel cell stack being placed vertically below the cabin; and
   a horizontally extending cooling radiator, the cooling radiator being placed between the cabin and the fuel cell stack.

2. The vehicle cab arrangement according to claim 1, wherein the cooling radiator is placed to be horizontally extending within an angle of inclination (a) of at most 15 degrees.

3. The vehicle cab arrangement according to claim 1, wherein the cooling radiator has an inlet for receiving an airflow for providing cooling to the cooling radiator and an outlet for exhausting the airflow as heated when passing through the cooling radiator.

4. The vehicle cab arrangement according to claim 3, wherein the inlet is placed on a vertically downwards facing surface of the cooling radiator.

5. The vehicle cab arrangement according to claim 3, wherein the inlet comprises first guiding means for guiding cool air from outside of the vehicle cab arrangement to the cooling radiator.

6. The vehicle cab arrangement according to claim 5, wherein the first guiding means is a first deflector.

7. The vehicle cab arrangement according to claim 3, wherein the outlet is placed on a vertically upwards facing surface of the cooling radiator.

8. The vehicle cab arrangement according to claim 3, wherein the outlet comprises second guiding means for guiding heated air from the cooling radiator to outside of the vehicle cab arrangement.

9. The vehicle cab arrangement according to claim 8, wherein the second guiding means is a second deflector.

10. The vehicle cab arrangement according to claim 1, wherein the vehicle cab arrangement further comprises a cooling circuit filled with a cooling medium, wherein the cooling circuit is arranged relative the fuel cell stack for the cooling medium to absorb heat from the fuel cell stack, and wherein the cooling radiator is arranged relative the cooling circuit for cooling the cooling medium.

11. The vehicle cab arrangement according to claim 1, wherein the fuel cell stack and the cooling radiator are provided in a sandwich arrangement.

12. A vehicle, the vehicle comprising a vehicle cab arrangement according to claim 1.

13. The vehicle according to claim 12, wherein the vehicle is any of: a truck, a bus, a piece of construction equipment, a personal vehicle.

\* \* \* \* \*